United States Patent [19]

Weslow

[11] 4,137,899
[45] Feb. 6, 1979

[54] MULTISTAGE SOLAR ENERGY CONCENTRATOR

[75] Inventor: Harold J. Weslow, Rte. 4, Riverside Dr., Green Bay, Wis. 54303

[73] Assignees: Harold J. Weslow; Jerome H. Weslow, both of Green Bay; Paul Netzow, Hartland; Thomas Weslow, Green Bay; Roland Weslow, Hartland, all of Wis.

[21] Appl. No.: 812,944

[22] Filed: Jul. 5, 1977

[51] Int. Cl.² .............................................. F24J 3/02
[52] U.S. Cl. ...................................... 126/271; 126/270
[58] Field of Search ................ 126/270, 271; 237/1 A

[56] References Cited

U.S. PATENT DOCUMENTS

| 1,325,596 | 12/1919 | Trosper | 126/271 |
|---|---|---|---|
| 1,473,018 | 11/1923 | Danner | 126/271 |
| 1,672,750 | 6/1928 | Christiansen | 126/271 |
| 1,673,429 | 6/1928 | Vinson | 126/271 |
| 1,683,266 | 9/1928 | Shipman | 126/271 |
| 2,277,311 | 3/1942 | Freeman | 126/271 |
| 2,902,028 | 9/1959 | Manly | 126/271 |
| 3,194,228 | 7/1965 | Bargues | 126/271 |
| 3,299,881 | 1/1967 | Koch | 126/271 |
| 3,587,559 | 6/1971 | Nonaka | 126/271 |
| 3,822,692 | 7/1974 | Demarest | 126/271 |
| 3,915,148 | 10/1975 | Fletcher et al. | 126/271 |
| 3,929,121 | 12/1975 | Rogers | 126/271 |
| 3,929,122 | 12/1975 | Alkasab | 126/271 |
| 3,981,295 | 9/1976 | Minnick | 126/271 |
| 3,985,118 | 10/1976 | Bard | 126/271 |

Primary Examiner—William F. O'Dea
Assistant Examiner—Larry Jones
Attorney, Agent, or Firm—Ralph G. Hohenfeldt

[57] ABSTRACT

A plural stage solar radiation fluid heater comprises a housing having a top in which there is an array of lenses. Near the inside bottom of the housing, there is a first fluid conduit located at the foci of the lenses for absorbing primary solar radiation focused thereon. One or more additional conduits are interposed between the first conduit means and the lenses and are arranged to permit passage of the ray bundles from the lenses to the first conduit means. The arrangement is such that the intervening circuit means intercept secondary terminal radiation which is re-radiated from the next adjacent hotter conduit means.

17 Claims, 7 Drawing Figures

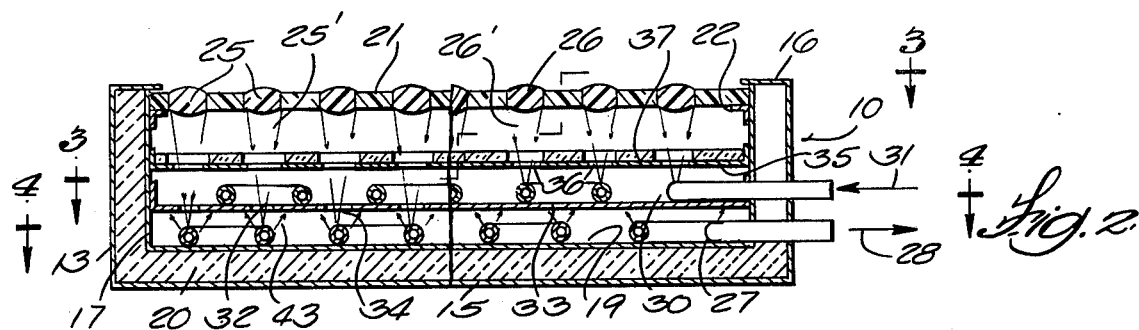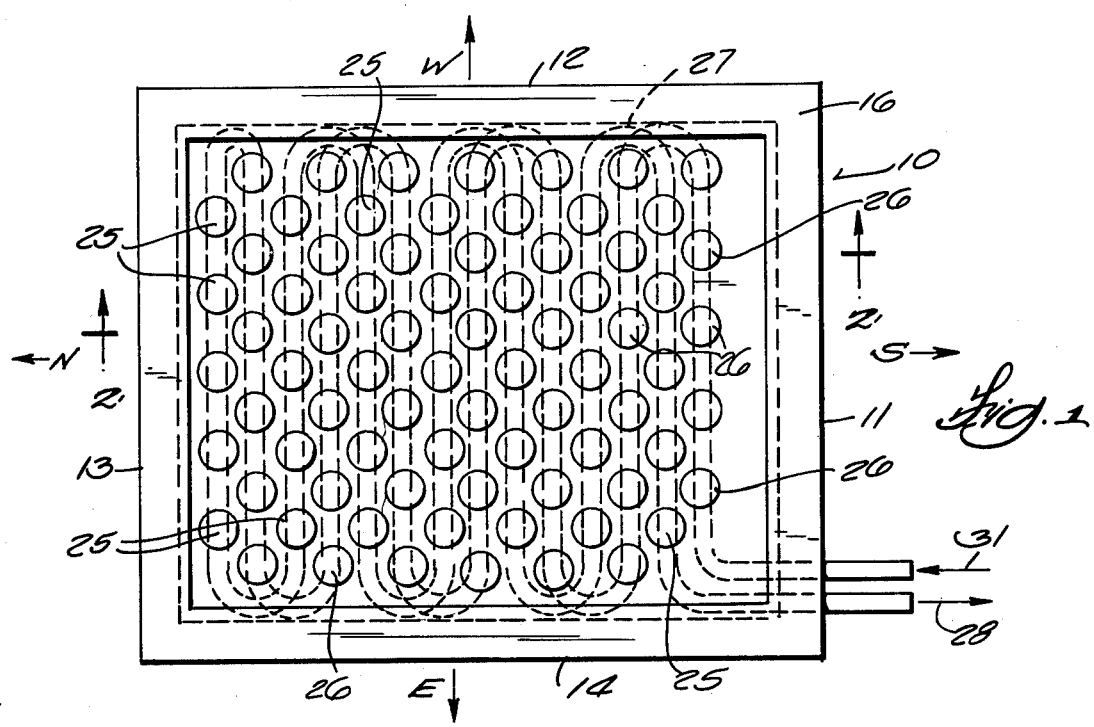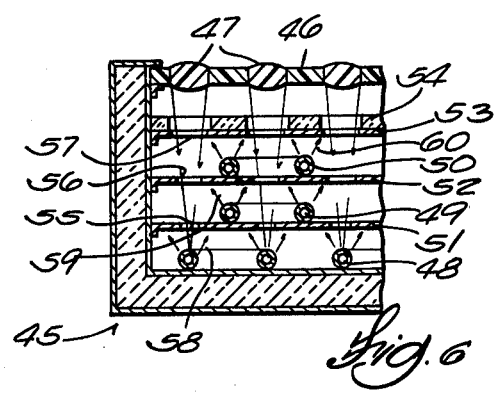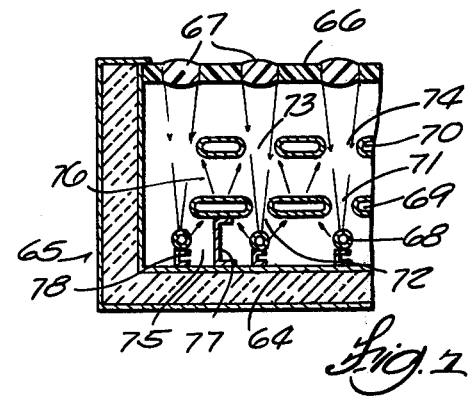

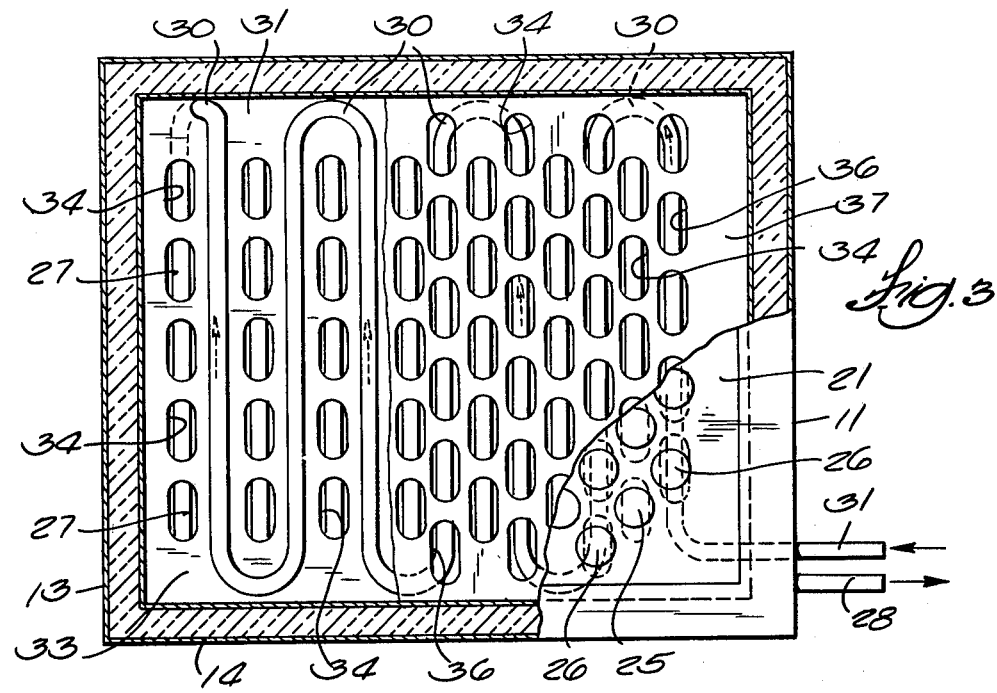
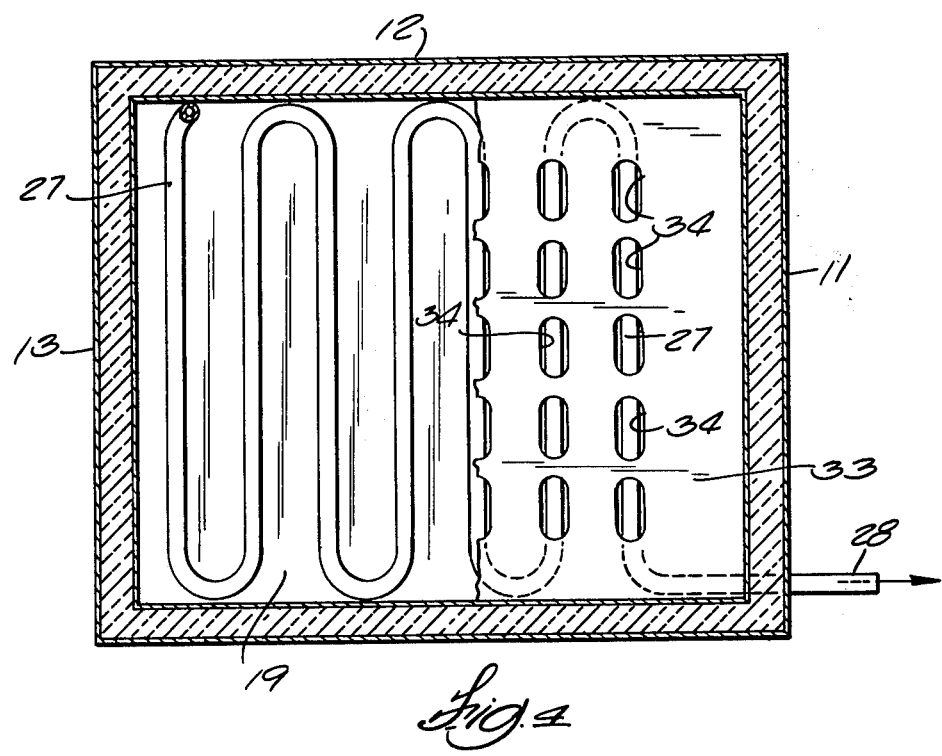

MULTISTAGE SOLAR ENERGY CONCENTRATOR

BACKGROUND OF THE INVENTION

This invention relates to apparatus for utilizing solar radiation to heat fluid. In particular, the invention pertains to improvements in the class of solar energy converters known as concentrators in which lenses are used to focus the radiant energy of the sun onto a heat absorbing and transferring surface.

Prior art solar energy concentrators may be generally characterized as having a conduit through which the fluid that is to be heated flows. The conduit is in an insulated housing, usually near its bottom. One or more lenses are arranged in a suitable support at a short distance from the conduit for focusing images of the sun on the conduit. The conduit is usually bonded to a metal plate which has a dark surface for enhancing absorption of stray solar radiation rays which are outside of the focal path of the lenses. Concentrating or focusing primary solar radiation which is collected over a large surface area onto a relatively smaller area on the fluid conduit enables the temperature of the fluid to be raised to a higher level than would otherwise be obtainable if the solar energy were distributed over a greater area.

In prior art solar energy concentrators, a substantial portion of the energy in the solar radiation spectrum which is converted to useful heat is lost to the ambient by reradiation, convection and conduction. The present invention is concerned with reducing these losses.

The principles and problems of prior solar energy concentrators are revealed in some prior patents. In U.S. Pat. No. 3,915,148, an array of Fresnel lenses is disposed in the top opening of a housing for concentrating or focusing primary radiation from the sun in parallel focal lines on an absorber comprised of several v-shaped conduits on the apexes of which the focal lines occur. A measure taken in the patent to reduce re-radiation of thermal energy from the absorber is to predetermine the angle between the walls of the v-shaped conduits so that one wall emits radiation to the other. There is nothing but air intervening between the absorbers and the lenses. The air convects and conducts heat away from the absorbers. It is in contact with the lenses which, in turn, have their outer surfaces in heat exchange relationship with atmospheric air. The flow of relatively cool atmospheric air over the outside of the lenses results in significant loss of heat from the interior of the concentrator by convection and conduction as well as by re-radiation.

U.S. Pat. No. 3,985,118 discloses a solar furnace which uses Fresnel lenses to focus solar radiation, gathered over a large area, onto a corresponding number of heat conducting members that extend into vessels which are occupied by the fluid to be heated. In this patent, a heat barrier or sheet is disposed between the lenses and the vessels on which the radiation is concentrated. The barrier has holes for passing the converging solar rays to the heat absorbing and conducting members. The heat barrier, however, absorbs secondary or re-radiated infrared radiation and does not participate in any substantial way in transferring heat to the fluid. The barrier would seem to reach thermal equilibrium.

Another solar energy concentrator for heating fluid is disclosed in U.S. Pat. No. 3,981,295. It is characterized by an insulating housing which has an array of lenses in its top and a pair of slightly spaced apart plates in its bottom. A thin film of heat absorbing fluid flows between the plates. The top plate on the side of the lenses is darkened to enhance absorption of radiation. There is nothing intervening between the absorber plate and the lenses to intercept secondary infrared radiation that would be emitted by the absorbing plate. The area of the absorber presented to the exterior of the housing is so great that a substantial amount of the heat could be re-radiated to the atmosphere. No means are provided for utilizing the re-radiated thermal energy.

U.S. Pat. No. 3,929,121 discloses a solar energy concentrator comprising an insulated housing with a cover in which there are a plurality of lenses. A number of glass bulbs are arranged in the bottom of the housing under the lenses for primary solar radiation to be focused on the bulbs. The bulbs have a dead air chamber disposed over a chamber which is occupied by the fluid to be heated. The last named chambers are connected in series to obtain a continuous fluid flow path. The dead air space has glass on one side of it and an absorbing surface on the other. The air in the space has some insulating quality but it will absorb no significant amount of infrared or heat radiation which is re-radiated by the absorber.

There are several other patents on solar heaters which use lenses to concentrate the radiation known to applicants but, on inspection, they appear to disclose no means for minimizing losses due to re-radiation of heat energy from the absorber. U.S. Pat. No. 1,672,750 simply has lenses focused on a broad area absorber plate under which water flows and there is only air space between the plate and lenses. U.S. Pat. No. 2,277,311 has a fluid conduit supported in a housing on insulating material with an array of lenses covering the coil. U.S. Pat. No. 1,683,266 discloses a solar heating apparatus using a parabolic reflector with the fluid conducting tube at the focus. An array of lenses across the parabola focuses onto reflectors on the parabolic surface which, in turn, redirect the focused beams to the tube. U.S. Pat. No. 3,822,692 also discloses a device that uses lenses to focus the sun's rays on water filled tubes for generating vapor to run an engine. U.S. Pat. No. 1,673,429 discloses a water heater comprising a plurality of lenses arranged along the path of a zig-zag shaped water tube within an insulating housing.

SUMMARY OF THE INVENTION

A primary object of the present invention is to provide a concentrator which converts more of the radiant energy available from the sun to useful thermal energy for heating fluid.

Another important object is to provide a solar energy concentrator that has a plurality of stages which each have a fluid conducting conduit means arranged so that primary or direct solar radiation, which is concentrated on at least one of the conduits by means of lenses, will impart high temperature to the fluid in that conduit, and so that secondary or infrared radiation which is re-radiated by the hot conduit will be absorbed by at least one other conduit to thereby minimize loss of energy to the ambient.

A further object is to provide a solar energy concentrator in which losses of heat by conduction, convection and re-radiation are reduced.

Yet another object is to provide a solar energy concentrator that has a short start up time following a period in which there has been no solar exposure or, stated in another way, a capability for producing fluid having the high output temperature that is desired within a short time following reappearance of the sun.

Other objects are to provide a solar energy concentrator which has simplified structure, is comparatively easy to produce and is easy to maintain.

The new solar energy concentrator is characterized generally by an insulated housing having a top opening. A preferably transparent support in which an array of focusing lenses is disposed covers the opening. There are fluid flow conduits at different levels or stages within the housing. Typically, the lenses, or a majority of them, focus primary solar radiation on the conduit which is in the focal plane of the lenses. At least one other conduit at a level between the first conduit and lenses is arranged so it will permit the primary radiation to be focused on the first conduit but will absorb secondary or infrared radiation which is re-radiated by the first conduit to thereby intercept and effectively use such secondary radiation without permitting loss of any substantial part of it to the ambient.

How the foregoing and other more specific objects of the invention are achieved will be evident in the ensuing description of illustrative embodiments of the invention in which reference will be made to the drawings.

DESCRIPTION OF THE DRAWINGS

FIG. 1 is a plan view of a solar energy concentrator in accordance with the invention;

FIG. 2 is a section taken along a line corresponding approximately with the line 2—2 in FIG. 1;

FIG. 3 is a plan view of the concentrator with parts broken away to exhibit the structure at different planes, the planes being defined generally by the line 3—3 in FIG. 2;

FIG. 4 is a transverse section taken along the irregular plane 4—4 in FIG. 2;

FIG. 5 shows a fragment of a lens structure which may be used in the concentrator;

FIG. 6 is a fragmentary section of an alternative embodiment of the new concentrator; and FIG. 7 is a fragmentary section of another alternative embodiment of the concentrator.

DESCRIPTION OF A PREFERRED EMBODIMENT

Referring to FIGS. 1 and 2, the concentrator comprises a housing, generally designated by the reference numeral 10. The housing has a plurality of outer side walls 11-14 and a bottom 15. The upper ends of the housing walls are turned inwardly as indicated to provide a flange 16. The housing has inner walls such as those marked 17 and 18 and a bottom 19 which define a volume in conjunction with outer walls such as 11 and 13 and bottom 15 which is occupied by thermal insulation 20. The inner and outer housings may be comprised of any suitable sheet material such as steel, aluminum or plastic.

A sheet 21, preferably of transparent material, serves as a cover or enclosure for the inner housing. The sheet is shown as being supported on angle brackets such as 22 which are fastened onto the inner housing walls.

A plurality of lenses such as those marked 25 and 26 are secured in cover sheet 21. These lenses are positive lenses which focus primary solar radiation at focal spots which are inside of the housing. The focal cone for the longer focal length lenses 25 is marked 25' and the focal cone of a typical shorter focal length lens 26 is marked 26'. In FIG. 1, one may see that lenses in columns which contain lens 25 are staggered in respect to columns which contain lenses 26.

Disposed remotely from the lenses on the inner bottom 19 of the housing is a serpentine shaped tubular conduit 27 whose fluid outlet end is indicated by the arrow marked 28. Conduit 27 is disposed in what is termed a first heating stage for convenience. In a plane less remote from the lenses than conduit 27 is another serpentine shaped conduit 30. Its inlet end is indicated by the arrow marked 31. Conduits 27 and 30 are connected in series to provide a continuous fluid flow path between inlet 31 and outlet 28. In operation of the concentrator, a fluid which is to be heated is pumped or otherwise circulated through the series connected conduits which are solar energy absorbers. The working fluid may be water. Normally, however, a low specific heat fluid having a low freezing temperature is circulated through the conduits, especially in climates where ambient temperature is likely to fall below the freezing point of water. The inlets and outlets may be connected to heat exchanger coils, not shown, in a storage tank, for example, where the heat which has been imparted to the fluid circulating in the conduits may be transferred to water or other fluid or solid which may be used for domestic or industrial purposes.

Note in FIG. 2 that the portions of the conduit 30, which extend back and forth across the interior of the housing, lie in different planes than the portions of conduit 27 in the first stage. As can be seen in FIG. 2, particularly, adjacent portions of conduit 30 provide free spaces such as the one marked 32 which allow the focused rays from the sun to fall unobstructed on first level conduit 27 without any intervening absorption taking place.

In the FIG. 2 embodiment, second stage conduit 30 is supported on a panel or plate 33 of heat absorbing and heat conducting material. The plate has an array of staggered elongated openings, one of which is marked 34 in FIG. 2. These openings provide a further passageway for the focal cones from lenses 25 to reach their focal points on first stage conduit 27. Supporting plate 33 is preferably blackened or otherwise coated with a material that enhances absorption of secondary or infrared radiation which is re-radiated by conduit 27 after it and its fluid contents become heated due to the intense primary solar energy dissipated at the focal spots of the lenses. Absorber 33 conducts heat, due to absorption of re-radiated energy, to second stage conduit 30.

Disposed over the second stage conduit 30 in this embodiment, is another plate 35 of heat absorbing and conducting material which has a plurality of elongated openings or perforations, such as the one marked 36, to provide a passageway for the focal cones of the radiation that is focused at various points on second stage conduit 30. As can be seen in FIG. 2, an insulating layer 37 having openings corresponding to 36, is mounted on plate 35. In this embodiment, plate 35 spans from inner wall to inner wall of the housing and is fastened to opposite walls to provide for its support. The bottom of plate 35 may be conditioned for enhanced reflection of infrared radiation back to the second stage conduit 30. Plate 35 and insulating layer 37 form a shield which reduces the amount of infrared or thermal band radiation that can be re-radiated to the atmosphere. The shield tends to hold down the temperature of the air between it and lens sheet 21. This reduces the temperature differential between the inside and outside of sheet 21, and thereby minimizes heat loss to the atmospheric ambient.

Refer now to FIGS. 3 and 4 where the structural elements of the concentrator are revealed in layers to facilitate clarification of the structure. The topmost layer is present in the lower right corner of FIG. 3, and is seen to comprise the transparent lens supporting sheet 21 in which the rows of lenses 25 and 26 are disposed. Immediately below it and exposed to the incoming side of the sun's rays is the insulating layer 37 which covers the underlying substrate plate 35 in which the elongated openings 36 are present. Below the plate, second stage conduit 30 is revealed. Beneath conduit 30 is sheet 33 which has the elongated openings 34 for permitting the cones of radiation to reach underlying conduit 27 in the first stage. Note in the upper left region of FIG. 3 that second stage conduit 30 curves downwardly to join first stage conduit 27 which bends upwardly to thereby form a continuous flow path between upper stage conduit inlet 31 and lower stage conduit outlet 28. First stage conduit 27 can also be spaced from the plane of the inner bottom 19 of the housing to reduce heat transfer to the bottom. This reduces the time required to get first stage conduit hot which is advantageous, especially during start-up.

FIG. 4 reveals the lowermost or first stage in two layers. First stage conduit 27 is shown disposed in serpentine fashion on the inner bottom 19 of housing 10. Superimposed over part of conduit 27 as shown in FIG. 4 is the sheet 33 which has the perforations or elongated openings 34 for enabling the focal cones of radiation from some of the lenses to reach and focus on first stage conduit 27.

It may be noted that the openings 34 and 36 are elongated in the east and west direction so that the lenses will be effective to focus the image of the sun on the conduits at both sides of the sun's zenith. In FIG. 1, the side of the unit which is northernmost when in use is marked N and W, S and E are used to indicate the west, south and east sides, respectively. The conduits in the different stages are preferably disposed in planes to which the rays of the sun are perpendicular. Mechanisms for mounting the unit so it tracks the sun and maintains substantial perpendicularity are known and are therefore not shown.

Although conduits 27 and 30 in the two stage concentrator which has been described above are made of tubing formed in a serpentine pattern, it will be appreciated by those skilled in the art that the conduit may have other configurations and cross sections. Any arrangement which permits focused radiation to be transmitted between spaces in the conduit which is nearest the lenses to the conduit which is most remote from the lenses will allow taking advantage of the novel features of the design.

It should be understood that it is within the purview of the invention to arrange all of the lenses in the array for focusing exclusively on the first level conduit 27.

Various kinds of lens supporting structures may be used. Individual lenses of glass or other suitable optical material may be inserted in preformed holes in the transparent sheet 21, for instance. The lenses may also be formed integrally with the transparent sheet as suggested in FIG. 5. In this figure, double convex lens areas 40 and 41, for example, are molded integral with sheet 42. The lenses and transparent sheet material should be chosen for highest solar radiation transmission qualities. The conduits should preferably be at a distance from the lenses which results in the most intense concentration of solar radiation on the conduit. This distance may be slightly different than the calculated theoretical optical focal distance of the lenses. Hence, the term focus is used herein in its broadest and practical sense to imply substantial focusing. The focal distance at which energy concentration is most intense for particular lenses can be determined experimentally easily. In one practical design, lens supporting sheet 21 is comprised of the well-known material known by the trademark Lucite or its equivalents.

Before describing modified versions of the concentrator, its operating mode will be briefly discussed. First of all, the concentrator is mounted to present the lenses to the direct rays of the sun. The lenses then focus an image of the sun containing its radiation spectrum at intermittent points along the first stage conduit 27. At the start, the intense heat at the focal spots is conducted at a high rate to the heat exchange fluid in the conduit. As long as there is a temperature differential between the outer wall of the tubular conduit in this case and the fluid, heat will flow into the fluid. Incidental to heating first stage conduit intensely with primary solar radiation, there is re-radiation of the secondary infrared radiation from the first stage conduit. The intensity or energy of the infrared radiation depends, of course, on the temperature of the first stage conduit at any time. In prior solar energy converters, the secondary radiation is invariably returned to free space outside of the converter housing. In the present design as illustrated in FIG. 2, however, this infrared radiation is intercepted and absorbed by the intervening conductive support sheet 33 for the second stage conduit 30. This absorbed energy is, of course, quickly transferred to second stage conduit 30 by conduction. This preheats the heat exchange fluid as it flows in the direction indicated by the arrow 31 at the inlet. It will be understood, that the coldest fluid enters the uppermost inlet 31 and the hottest fluid exists in the lower conduit and flows out of the outlet which is indicated by the arrow 28. Because of the fluid in conduit 30 being relatively cold, a substantial temperature differential can exist between the sheet 33 which absorbs the secondary radiation and the tubular conduit 30, so there is a substantial transfer and utilization of the absorbed secondary radiation. The pathways followed by the secondary radiation which is generally in the long wavelength infrared part of the spectrum is suggested by the short arrows marked 43 in FIG. 2 and shown as being radiated out from conduit 27. A minor amount of secondary radiation can be lost on the return path of the lenses, but most of it will be reflected back into the housing by the lenses and sheet material which supports them. Moreover, secondary radiation which might otherwise exit through the transparent sheet 21 and be lost can be absorbed by the plate 35 and re-radiated to second stage conduit 30. The insulating layer 37 on plate 35 enhances this phenomena.

It should be noted that hottest conduit 27 is most remote from lens supporting sheet 21 which is exposed on one side to the atmosphere. On the other hand, the intervening secondary radiation absorbers, including second stage conduit 30 and insulated plate 35, are cooler. As stated earlier, this minimizes the temperature differential between the atmosphere outside of the lens sheet and the components inside of the housing which are nearest to it. The reduced differential which is thus obtained results in less heat being lost by radiation, convection and conduction to the atmosphere on the transparent side of the concentrator.

A three stage version of the concentrator is shown in FIG. 6. It comprises an insulated housing marked 45 which is substantially similar, except for its dimensions, to housing 10 in the previously discussed embodiment. Similarly, a transparent sheet 46 containing an array of lenses 47 encloses the housing. In this embodiment, there are three conduits 48, 49 and 50 in spaced apart planes or stages which are respectively decreasingly remote from the lenses. The conduits are connected in series with each other as in the previously discussed embodiment. The coolest fluid enters as it did in the previous case through the uppermost or third level conduit 50, and flows in sequence to and through conduits 49 and 48 in that order.

In FIG. 6, conduit 49 is bonded in heat exchange relationship with a supporting plate 51. Similarly, conduit 50 is bonded to a plate 52. Interposed between third stage conduit 50 and transparent sheet 46 is another plate or sheet 53 which is covered with insulation 54. Plates 51, 52 and 53 have aligned elongated slots 55, 56 and 57, respectively. These slots provide a passageway for the cone of concentrated solar radiation to focus on first stage conduit 48 only and at intermittent points thereon.

The operational mode is comparable to that of the previously discussed embodiment. The lower conduit, which is most remote from the lenses, becomes the hottest and re-radiates substantial infrared or heat energy in the general direction indicated by the rays marked 58. This radiation is absorbed in plate 51 and conducted to the second stage conduit 49 whose temperature will rise as a result. Thus, second stage conduit 49 emits secondary heat radiation indicated by the rays 59. This radiation is absorbed in plate 52 and transferred to third stage conduit 50. Because of third stage conduit 50 rising above ambient temperature, there is further secondary radiation emitted from it as suggested by the rays marked 60. This radiation is absorbed and re-radiated by plate 53 which is prevented from losing heat to the atmosphere by the presence of insulating layer 54. It will be evident that the FIG. 6 embodiment provides substantial impediment to loss of secondary radiation from the conduits to the atmosphere.

FIG. 7 shows a fragment of an alternative embodiment of the invention which has some features which are not present in the others. It comprises an insulating housing 65 which is enclosed at its top by a transparent sheet 66 in which lenses 67 are arranged. In this embodiment, the first stage conduit 68 comprises a plurality of interconnected tubular sections, which are shown in section, and are understood to extend perpendicular to the drawing. This conduit is anchored to the inner bottom 64 of the housing. Second stage conduit 69 is comprised of interconnected tubular sections which are oblong in cross section. A third stage conduit 70 is also comprised of tubular sections which are oblong in cross section and are disposed perpendicular to the drawing. The tubular sections of conduit 69 are spaced apart laterally from each other to define spaces such as 71 and 72 through which the radiation cone from the lenses may pass for being focused on first stage conduit tubular section 68. Similarly, third stage conduit sections are spaced apart laterally to define spaces such as 73 and 74 for the radiation cone to pass. Spaces such as 73 and 74 are wider than spaces 71 and 72 to avoid interception of any of the primary solar radiation by conduits 69 and 70 which intervene between the lenses and first stage conduit 68. It will be evident that in this embodiment, first stage conduit 68 will be the hottest and will re-radiate substantial thermal energy. This thermal or infrared radiation is directed as suggested by the arrow headed rays marked 75 to fall upon and be absorbed by second stage conduit 69. Thermal radiation that is re-radiated from conduit 69, on the other hand, will be re-radiated to the lower temperature heat sink presented by third stage conduit 70 as suggested by the rays marked 76. In this embodiment, plates for supporting the second and third stage conduits can be dispensed with and the conduits may be supported by straps or pedestals fastened to the sides or inner bottom of the housing. Pedestals in the form of periodically spaced channel shaped members 77 and 78 are used to space all of the conduits away from inner housing bottom 64.

As a general rule, in any of the embodiments which utilize the re-radiated energy recapture techniques discussed above it is desirable to maximize the temperature of the first stage conduit. This means that the lenses should be arranged so that all of them focus on the first stage if possible.

It is worthy to observe that the walls of the first stage conduit are ordinarily hotter than the fluid medium in them. It is desirable to design for holding a temperature differential between the walls of the conduit and the medium at all times. Without a temperature differential, there could be more re-radiation than absorption. It is evident that temperature equilibration between the various conduit walls and the fluid medium in them is unlikely to occur. This is in contrast with conventional surface plate solar collectors which often obtain temperature equilibration and retard or stop heat transfer. In the present design, there is always an intervening absorber for re-radiated energy which is at a lower temperature so that equilibration occurring under any circumstances is not forseeable.

Although several embodiments of the new concentrator have been described to elucidate the requisite geometrical relationships and principles of the invention, such description is intended to be illustrative rather than limiting, for the invention may be variously embodied and is to be limited only by interpretation of the claims which follow.

I claim:

1. Apparatus for utilizing solar radiation to heat fluid comprising:

a housing, support means and a plurality of lenses arranged on said support means for focusing solar radiation into said housing, a first plurality of interconnected and spaced apart conduit means for conducting fluid which is to be heated, said first conduit means being disposed in said housing substantially at the focus of said lenses remotely from said support means, and a second plurality of interconnected and spaced apart conduit means in said housing for conducting fluid which is to be heated, said second conduit means being interposed between said first conduit means and said lenses and being less remote from said support means than said first conduit means, said second conduit means being arranged to allow spaces for passage of focused solar radiation to said first conduit means and to intercept radiation that is re-radiated by said first conduit means.

2. Apparatus as in claim 1 wherein said first and second conduit means each have input and output means, the input means of said second conduit means being for receiving fluid which is to be heated, the output means of said second conduit means being coupled with the input means of said first conduit means and the output means of said first conduit means being for discharge of fluid which has been heated.

3. Apparatus as in claim 1 including:
radiant energy absorber means supporting said second conduit means and being in heat transfer relationship therewith, said absorber means being interposed between said first and second conduit means for absorbing said re-radiated radiation and being constructed and arranged for providing a plurality of openings for said passage of focussed solar radiation.

4. The apparatus as in claim 3 including heat shield means disposed inside of said housing for substantially intercepting radiation which is re-radiated from said conduit means in the direction of said lenses, said shield means being constructed and arranged for allowing unobstructed passage of focused solar radiation from said lenses to said conduit means.

5. Apparatus as in claim 1 including:
heat conductive plate means supporting said second conduit means and being in heat transfer relationship therewith, said plate means supporting said second conduit means and being interposed between said first and second conduit means for absorbing said re-radiated radiation, said plate means having a plurality of openings for said passage of focused solar radiation.

6. The apparatus in claim 5 wherein said openings are elongated in the direction of the east and west orientation of said concentrator when it is in use.

7. The apparatus as in claim 1 wherein some of said lenses are focused on the first conduit means and others of said lenses are focussed on said second conduit means.

8. The apparatus as in claim 1 wherein said first and second conduit means are offset laterally from each other for enabling focused solar radiation from at least some of said lenses to pass said second conduit means and focus on said first conduit means.

9. Multistage apparatus for utilizing solar energy to heat fluid, comprising:
a housing,
support means and a plurality of lenses arranged on said support means for focusing solar radiation into said housing,
a plurality of conduit means in said housing each having input and output means, said conduit means being arranged respectively increasingly remotely from said lenses,
said conduit means which is most remote from said lenses being substantially at a distance from said lenses whereat concentration of solar radiation by said lenses is most intense, said conduit means which are less remote from said lenses being constructed and arranged for permitting unobstructed passage of said solar radiation to said most remote conduit means and for absorbing thermal energy that is re-radiated from next adjacent more remote conduit means.

10. The apparatus as in claim 9 wherein the input means of the conduit least remote from said lenses is for receiving the fluid which is to be heated, means for coupling the output means of conduit means which are more remote from said lenses to the input means of the next less remote conduit means, the output means of the conduit means most remote from said lenses for discharging fluid which has been heated.

11. The apparatus as in claim 9 including heat shield means interposed between the least remote conduit means and said lenses, said heat shield means having passageways for said solar radiation from said lenses to reach said conduit means.

12. The apparatus as in claim 9 wherein said support means for said lenses comprises a sheet.

13. The apparatus as in claim 9 wheren solar radiation from some of said lenses is concentrated on the conduit means which are less remote from said lenses than said most remote conduit means.

14. The apparatus as in claim 9 including:
thermally conductive plate means on which the conduit means other than said most remote conduit means are supported, respectively, said plate means being disposed across said housing for absorbing re-radiated thermal energy, said plate means having openings for passage of radiation from said lenses.

15. The apparatus as in claim 9 including:
thermally conductive plate means to which the conduit means other than said most remote conduit means are suported, respectively, said plate means being disposed across said housing for absorbing re-radiated thermal energy, said plate means having openings for passage of focused radiation, and
heat shield means interposed between the least remote conduit means and said lenses, said heat shield means having passageways for said radiation from said lenses to reach said conduit means.

16. Apparatus for utilizing solar radiation to heat fluid comprising:
a housing,
support means and a plurality of lenses arranged on said support means for focusing solar radiation into said housing,
a first plurality of interconnected and spaced apart conduit means for conducting fluid which is to be heated, said first conduit means being disposed in said housing substantially at the focus of said lenses remotely from said support means, and
a second plurality of interconnected and spaced apart conduit means in said housing for conducting fluid which is to be heated, said second conduit means being interposed between said first conduit means and said lenses and being less remote from said support means than said first conduit means, said second conduit means being arranged to allow spaces for passage of focussed solar radiation to said first conduit means and to intercept radiation that is re-radiated by said first conduit means,
heat shield disposed inside of said housing for substantially intercepting radiation which is re-radiated from said conduit means in the direction of said lenses,
said shield means comprising a sheet of heat conductive material and a layer of insulation interposed between said sheet and said lenses, said sheet and layer having a plurality of aligned openings for said passage of focused radiation.

17. Multistage apparatus for utilizing solar radiation to heat fluid, comprising:

a housing having sides and a bottom, support means and a plurality of lenses arranged on said support means for directing beams of solar radiation into said housing, first conduit means, for conducting fluid to be heated, disposed in a plane adjacent the bottom of said housing, said conduit means comprising continuous laterally spaced apart portions running generally parallel to each other, radiation directed by at least some of said lenses being concentrated on said first conduit means, further conduit means disposed in a plane between said first conduit means and said lenses and comprising continuous laterally spaced apart portions running generally parallel to each other, the space between said portions being sufficient for unobstructed passage of converging solar radiation beams from said lenses to said first conduit means, said further conduit means being in a position for absorbing thermal energy that is re-radiated by said first conduit means, means for connecting said conduit means to enable relatively cool fluid to flow into and out of said second conduit means before flowing into and out of said first conduit means.

* * * * *

UNITED STATES PATENT AND TRADEMARK OFFICE
CERTIFICATE OF CORRECTION

PATENT NO. : 4,137,899
DATED : February 6, 1979
INVENTOR(S) : Harold J. Weslow

It is certified that error appears in the above-identified patent and that said Letters Patent are hereby corrected as shown below:

Claim 10, column 10, line 5, after "lenses" insert ---being---.

Claim 13, column 10, line 14, change spelling of "wheren" to ---wherein---.

Claim 16, column 10, line 55, change spelling of "focussed" to ---focused---.

Claim 16, column 10, line 58, after "shield" insert ---means---.

Signed and Sealed this

Fifteenth Day of May 1979

[SEAL]

Attest:

RUTH C. MASON
Attesting Officer

DONALD W. BANNER
Commissioner of Patents and Trademarks